Nov. 26, 1957 R. C. TEMPLIN 2,814,670

PHOTOELECTRIC COLOR-CONVERTER FOR CATHODE RAY TUBES

Filed Jan. 15, 1953

United States Patent Office 2,814,670

Patented Nov. 26, 1957

2,814,670

PHOTOELECTRIC COLOR-CONVERTER FOR CATHODE RAY TUBES

Raymond Cornell Templin, Philadelphia, Pa.

Application January 15, 1953, Serial No. 331,411

10 Claims. (Cl. 178—5.4)

This invention relates to photoelectric tubes and particularly to photoelectric tubes suited for attachment to or integration with television picture tubes for production of images in color.

In accordance with the present invention, a photoemissive cathode surface is disposed in proximity to the screen of a cathode ray tube for excitation by ultraviolet radiation emitted therefrom as a result of scanning of the screen by the electron beam of the tube and there are disposed in close proximity to the photoemissive cathode surface a plurality of anodes having fine-mesh surfaces, each of which is coated with material suited to fluoresce with color different from that of another of the anodes to produce a visible color reproduction of the ultraviolet image emitted by the screen.

The photoemissive cathode and the associated anodes constitute the essential elements of a color-converter which may be attached to the viewing face of a monochrome television picture tube to form a composite tube affording colored television, or it may be integrated in a picture tube of otherwise conventional construction so to suit it for color television.

As contrasted with arrangements using rotating color wheels suited only for field-sequential operation and even then difficult to maintain in synchronism, the photoelectric converter is also suited for line-sequential operation, dot-sequential operation, dot-group sequential operation, or any combination of them, the anode potentials of the converter being electronically switched in any sequence or combination determined by synchronizing signals in the picture signal. As contrasted with arrangements in which the screen is of differently fluorescing materials disposed in line or dot patterns, there is no loss of color registration upon variation of the vertical or horizontal size of the raster. As contrasted with arrangements in which the scanning electron beam is deflected sequentially to terminate on different color screens, there are avoided the difficulties encountered in switching of high potentials.

The invention further resides in features of construction, combination and arrangement hereinafter described and claimed.

For a more complete understanding of the invention and for illustration of embodiments thereof, reference is made to the accompanying drawings in which:

Fig. 1 schematically illustrates a colored television receiver system in which a monochrome picture tube is converted for color reproduction by a photoelectric color-converter;

Figure 1:
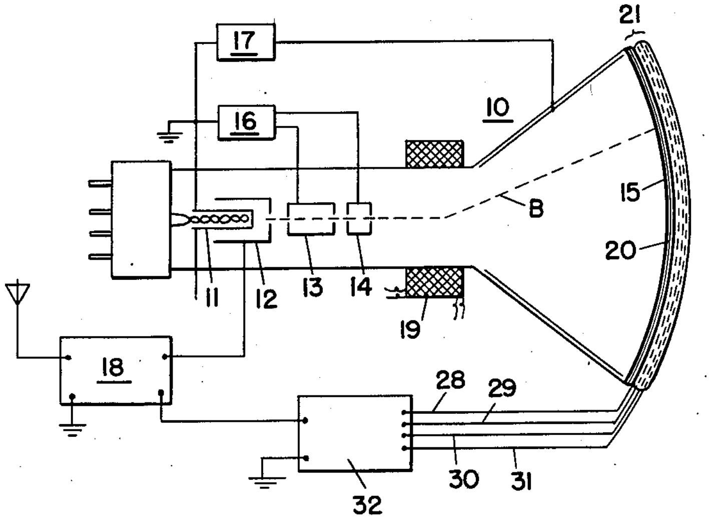
Figure 2:
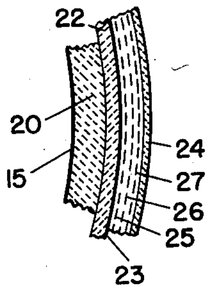
Fig. 2 is a fragmentary cross section of the viewing face of the picture tube of Fig. 1 and of the color-converter.

Referring to Fig. 1, the cathode ray tube 10 comprises a suitable electron gun consisting, for example, of the cathode 11, control grid 12 and anodes 13 and 14. The electron beam B formed by the electron gun is directed onto the coating 15 of material which fluoresces upon electron bombardment. The operating potentials for the electrodes of the electron gun are provided by a direct-current source 16 of moderately high voltage, usually of the order of a few hundred volts. The positive terminal of source 17 of very high potential is connected to a metallic bell which extends between the neck and face of the tube, or, when the bell is of glass, as indicated in Fig. 1, to a conductive coating on its inner or outer surface.

The intensity of the high-velocity electron beam is modulated by applying to the control grid 12 the output of the video-amplifier portion of the television receiver 18 receiving picture signals originating on magnetic tape or in a camera tube viewing film or a live scene. The beam B is deflected horizontally and vertically to scan the screen 15 by a deflection means of known type, such as the deflection coils 19, or alternatively, by deflection plates not shown. The beam deflection means is energized in known manner from the television receiver and synchronized by synchronizing components of the received signal.

As thus far described, and assuming the screen 15 is one of the usual phosphors intended for direct viewing, a visible image may be seen on the screen through the front face 20 of the tube. Such picture or image is in monochrome providing what is commonly known as a "black-and-white picture," even though the incoming signal may be suited for production of color images, the "black-and-white" areas of the picture respectively corresponding with the unactivated and activated areas of screen 15.

Simply and economically to convert the "black-and-white" picture tube to a color picture tube, there is provided a color-converter 21 which comprises a backplate 22 shaped to conform with and to extend over the face 20 of tube 10. This plate is preferably a sheet of so-called "black light" glass, such as Corex D #9700, having high transmissivity to ultraviolet radiation from screen 15 and substantially opaque to the visible light therefrom. The convex or inner face of the plate 22 is coated with a thin film 23 of photoemissive material, such as beryllium, calcium or cerium sensitive to ultraviolet radiation. Thus, the fluorescent image produced upon the screen 15 by the cathode beam is converted to an electron image within the converter 21.

Figure 3:
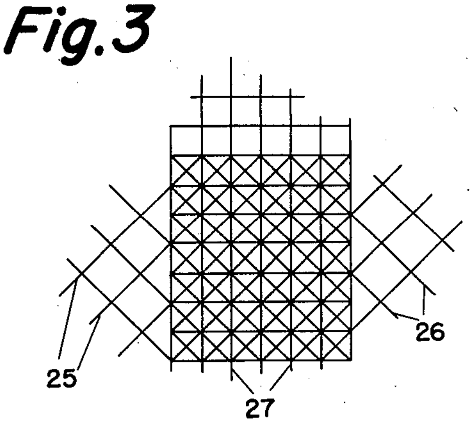
Figs. 3 and 4 are fragmentary views on greatly enlarged scale of anodes having different fine-mesh configurations suited for the color-converters of Figs. 1 and 5.
Figure 4:
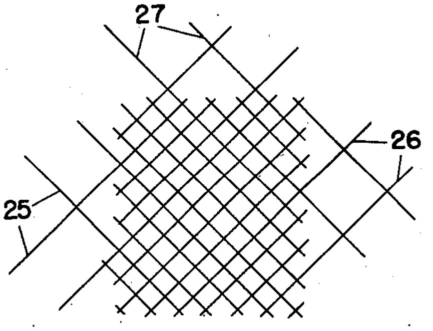

The front or viewing face of the converter 21 is a sheet 24 of ordinary glass, such as soda-glass, transparent to visible light but highly attenuating ultraviolet. The sheet 24 is of curvature corresponding to that of the rear plate 22 but is separated therefrom by an evacuated space of approximately a few millimeters. One or both of the plates 22, 24 have flanged edges which are bonded to form an envelope from which the air may be exhausted. Prior to joinder of the rear and front plates 22, 24, there are disposed between them the anodes 25, 26, 27 having fine-mesh surfaces of area corresponding with the area of screen 15 and of the photoemissive surface 23. These anodes are respectively coated with phosphor which fluoresces with different colors upon electron bombardment. Specifically, the anodes 25, 26, 27 are of phosphors which provide, for example, red, green and blue fluorescence in the order named. Suitable phosphors are known and need not be further described. Each of anodes 25–27 may be fabricated from gauze woven with very fine wire with light-transparent insulating material disposed between the cathode and anodes. Preferably, for ease of construction and to minimize parallax, at least the anodes 25 and 26 may be fabricated from woven fine spun glass coated on one side with a thin film of conductive material such as colloidal graphite or a silver salt. The anode 27 may be similarly fabricated or may be formed by imprinting or otherwise depositing a fine-mesh design upon the inner or concave surface of the front plate 24 of the converter. The mesh patterns of the different anodes are so oriented or offset that a color spot produced on either of the inner screens 25, 26 is not obscured by the screen or screens nearer to the eye of the observer. In the particular arrangements shown in Figs. 3 and 4, both the red and green mesh lines 25, 26 are at a 45° angle to the blue mesh lines 27 and are relatively displaced or interlaced as viewed by the observer from the front of the converter tube. The meshes of the anode should be as small as possible, for example, 65 or more apertures per linear inch. The converter 21 is provided with leads 28–31 for connection of the photoemissive cathode 23 and of the respective fine-mesh anodes 25–27 to operating potentials supplied, for example, by an electronic switching means 32.

At any given instant, the beam B terminates at a particular point on the fluorescent screen 15. In addition to production of visible fluorescence, there is also fluorescence in the ultraviolet which is not only not useful in production of the visible image but is a source of harmful effects on the eyes of the observer. In the converter 21 however, the ultraviolet radiation from the excited point of screen 15 is screened from the observer and utilized to bombard a corresponding point of the photoemissive cathode 23 there to provide electron emission. Depending upon which of the anodes 25 to 27 is then selected by application of potential positive with respect to the cathode backplate 22, there will be produced a spot of corresponding visible color—red, green, or blue. Preferably, the other anodes are then negative or are less positive with respect to the cathode for best definition of the color spot.

If the incoming television signal employs field-sequential operation, the successive complete fields or pictures are converted to red, green and blue visible images individually in any desired sequence and appear to the observer, because of persistence of vision, as a single multicolor image. In such operation, the switching of a positive potential from one of the anodes 25–27 to the next of them in sequence is effected once for each cycle of the field-repetition frequency, such switching being effected in manner per se known by multi-vibrator device or electronic switching means 32 triggered from synchronizing signals derived by receiver 18 from the incoming carrier. Similarly, for dot-sequential or dot-group sequential operation, the switching of a positive potential to the respective anodes 25–27 is controlled by multivibrator arrangement 32 or equivalent switching device triggered in accordance with synchronizing information of the picture carrier. In all cases, each of the nonselected anodes may be negatively biased in any suitable manner, either by a negative pulse derived from the electron switch or by a steady bias overcome by the positive switching pulse as each in turn becomes the selected anode.

By simultaneously applying a positive potential to all three anodes 25–27, the picture produced by the converter is a black and white picture of superior contrast, quality and sharpness, as all visible light from the rear of the converter 21 is effectively blocked by plate 22. For a color picture with enhanced resolution, such black and white interval may be interposed in the color sequence cycle by a modification of the circuitry of the multi-vibrator switch 32, assuming, of course, the incoming signal is of character intended for such mode of operation. It should here be noted that the switching potentials involved, i. e., the potential difference between the photoemissive cathode 23 and the anodes 25–27 is inherently low, and that the high-velocity electron beam B terminates upon screen 15 and does not pass into the converter 21.

In the color television tube thus far described, the converter is a separate entity suitably attached to the face of a conventional monochrome picture tube. Thus owners of "black-and-white" television receivers may economically convert their picture tube, the most expensive component, to one suited for color reproduction. The converter is not only economical, but also a highly efficient means of converting the energy of the electron beam into visible light because the high-energy of photons in the ultraviolet is productive of high emission of electrons from excited areas of cathode 23.

Figure 5:
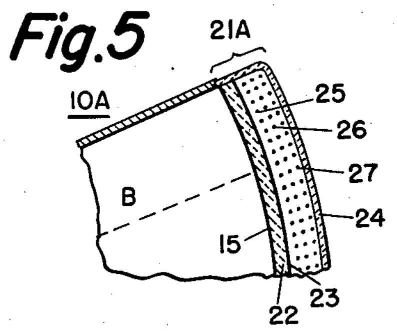
Fig. 5 is a fragmentary view of a color picture tube incorporating a color-converter as an integral part.

As shown in Fig. 5, the converter may be made an integral part of a picture tube in the course of its manufacture, and in such case the front face 20 of the picture tube of Fig. 1 may be omitted. Specifically, as shown in Fig. 5, the rear face of the rear plate 22 of the converter 21A may be coated with fluorescent material to form the beam target or screen 15. In such case, the screen phosphor may be, contrary to usual picture tube practice, of material producing radiation concentrated in the ultraviolet and having essentially no visible components. Specifically, this phosphor may be calcium tungstate, or it may be one of the phosphors known to the art as "360 BL" phosphor and "E" phosphor, and referred to in "Ultraviolet Radiation" by Koller, published by J. Wiley, New York. Also in such case, the supporting plate for the beam-target film 15 is of quartz "nonex" glass or like material particularly suited for high efficiency transmission of ultraviolet radiation. The edge or rim of the converter 21A is hermetically bonded to the bell of the cathode ray tube with the screen 15 facing the electron gun, as in Fig. 1, for bombardment by the electron beam B. The converter 21A is evacuated independently of the electron gun and beam section of tube 10A, and there is no possibility, for any position of the beam B, for passage of electrons between the two envelopes. The only transfer from one section of the tube to the other is that of the ultraviolet image emitted from the screen 15. In all other respects of construction and operation, the combined cathode ray and photoelectric converter tube of Fig. 5 is similar to the composite cathode ray and converter tube of Fig. 1.

What is claimed is:

1. A color-television tube comprising a screen for producing ultraviolet radiation, an electron gun for producing a beam of electrons terminating at one face of said screen, means for deflecting said beam to scan said screen and so effect emission of an ultraviolet image from the opposite face of said screen, a cathode having a photoemissive surface in close proximity to said opposite face of the screen and sensitive to ultraviolet radiation, and at least two anodes beyond the termination of said electron beam and having fine-mesh surfaces in close proximity to each other and said cathode surface, each of said anodes being coated with material suited to fluoresce with color different from another of the anodes to produce a visible image corresponding with said ultraviolet image.

2. A color-television tube as in claim 1 in which the electron gun, the screen, the cathode and said anodes are in different envelopes having a common wall and are permanently bonded to form a unitary structure.

3. A color-television tube as in claim 1 in which the electron gun and screen are in one air-exhausted envelope and in which the photoemissive cathode and the anodes are in another air-exhausted envelope whose cathode-supporting wall is shaped to conform with the screen-supporting wall of the first-named envelope.

4. A color-converter for disposition in front of the beam-receiving screen of a television picture tube comprising a cathode having a photoemissive surface in close proximity to and of area corresponding with said screen to produce an electron image of the screen image, and at least two anodes having fine-mesh surfaces in close proximity to and of area corresponding with said screen, each of said anodes being coated with material suited to fluoresce with color different from another of the anodes to produce a visible colored image corresponding with the electron image on the photoemissive cathode.

5. A color-converter as in claim 4 in which a sheet of material opaque to visible light but transparent to ultra-violet radiation is interposed between said photoemissive surface of the cathode and said beam-receiving screen.

6. A color-converter as in claim 5 in which said photoemissive cathode surface and said screen are coatings on opposite faces of said sheet.

7. A color-converter as an auxiliary for attachment to a black-and-white television tube comprising an exhausted envelope shaped to conform with and conseal the viewing face of said tube, a cathode having a photoemissive surface within said envelope and sensitive to radiation from said tube, and at least two anodes within said envelope and having fine-mesh surfaces in close proximity to each other and to said cathode surface in adjacent planes, each of said anodes being coated with material suited to fluoresce with color different from another of the anodes to produce a visible colored image.

8. A color-converter as in claim 7 in which the rear face of said envelope is of material opaque to visible light but transparent to ultraviolet radiation and in which the front face of said envelope is of material transparent to visible light but opaque to ultraviolet radiation.

9. An auxiliary photoelectric color-converter suited for use with the conventional monochrome picture tube of a television receiver comprising an air-exhausted envelope having a wall transparent to ultraviolet for disposition closely adjacent the viewing face of said monochrome picture tube, a cathode within said envelope, said cathode comprising a photoemissive coating on the inner face of said wall for emission of electrons in areas excited by ultraviolet radiation from the picture tube, and at least two anodes within said envelope, said anodes having fine-mesh surfaces in close proximity to said cathode, each of said anodes being coated with material suited to fluoresce with color different from another of the anodes upon bombardment by electrons from said cathode, said photoemissive cathode and said anodes having terminals for application of relatively low switching voltages determining the path of electrons from said photoemissive cathode to selected anodes for production by said converter of a color-television picture.

10. A photoelectric color-converter suited for a television picture tube comprising an air-exhausted envelope having a wall transparent to ultraviolet, a coating on the external face of said wall, said coating being of phosphor material producing ultraviolet radiation, a cathode within said envelope, said cathode comprising a photoemissive coating on the inner face of said wall for emission of electrons in areas excited by ultraviolet radiation from said external coating, and at least two anodes within said envelope, said anodes having a fine-mesh surfaces in close proximity to said cathode, each of said anodes being coated with material suited to fluoresce with color different from another of the anodes upon bombardment by electrons from said cathode, said photoemissive cathode and said anodes having terminals for application of relatively low switching voltages determining the path of electrons from said photoemissive cathode to selected anodes for production by said converter of visible colored images corresponding with an ultraviolet image produced by said external coating.

References Cited in the file of this patent

UNITED STATES PATENTS

| | | |
|---|---|---|
| Re. 23,802 | Sheldon | May 16, 1954 |
| 2,139,797 | Boerstler | Dec. 13, 1938 |
| 2,461,515 | Bronwell | Feb. 15, 1949 |
| 2,521,571 | Du Mont et al. | Sept. 5, 1950 |
| 2,529,485 | Chew | Nov. 14, 1950 |
| 2,553,182 | Cage | May 15, 1951 |
| 2,704,783 | Sziklai | Mar. 22, 1955 |

FOREIGN PATENTS

| | | |
|---|---|---|
| 942,375 | France | Feb. 7, 1949 |
| 336,317 | Great Britain | Oct. 16, 1930 |